Figure 1:
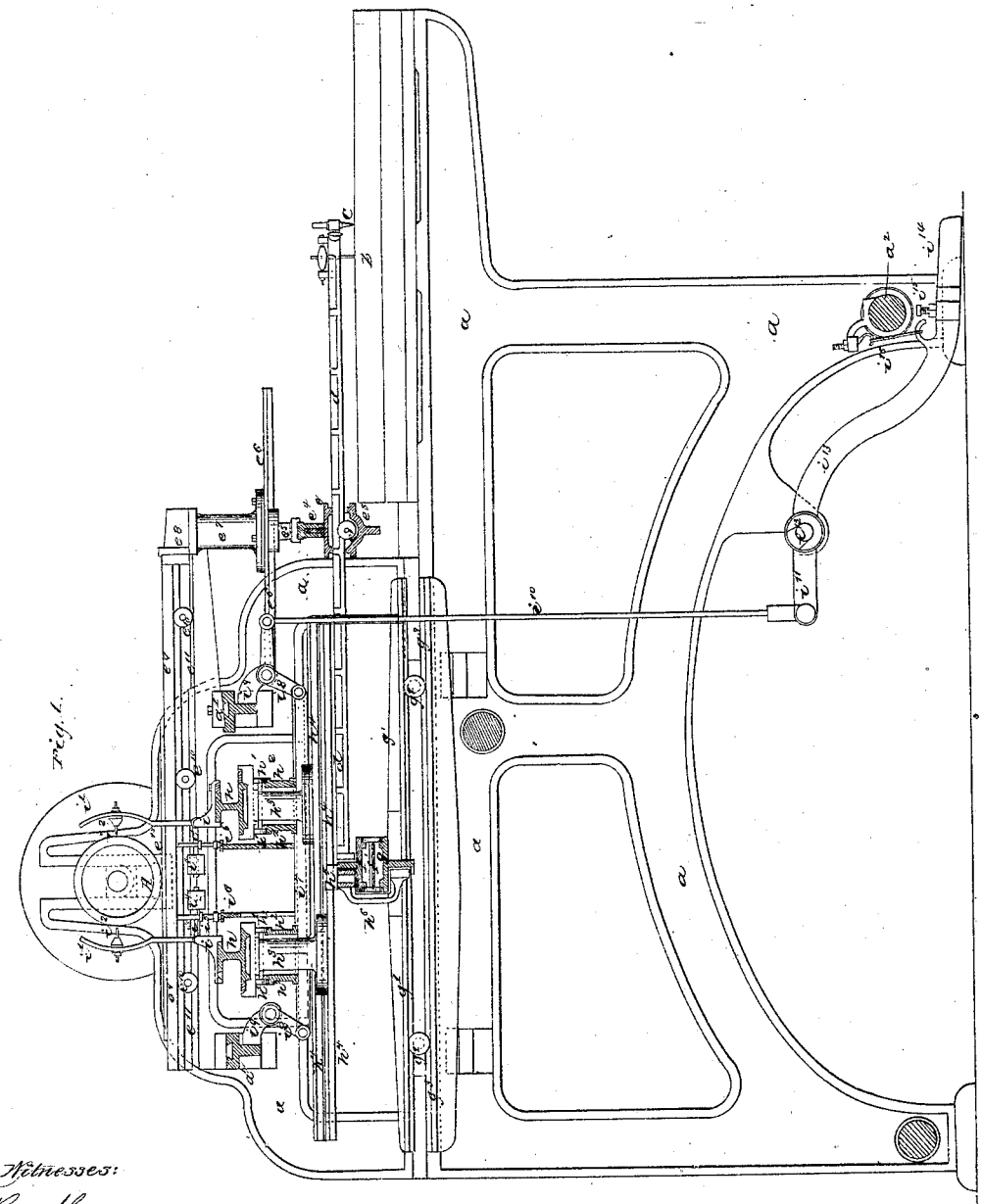

W. Shields,
Engraving Machine,

N° 28,332.  Patented May 15, 1860.

Witnesses:
Peter Lawson
W. Gifford

Inventor:
William Shields

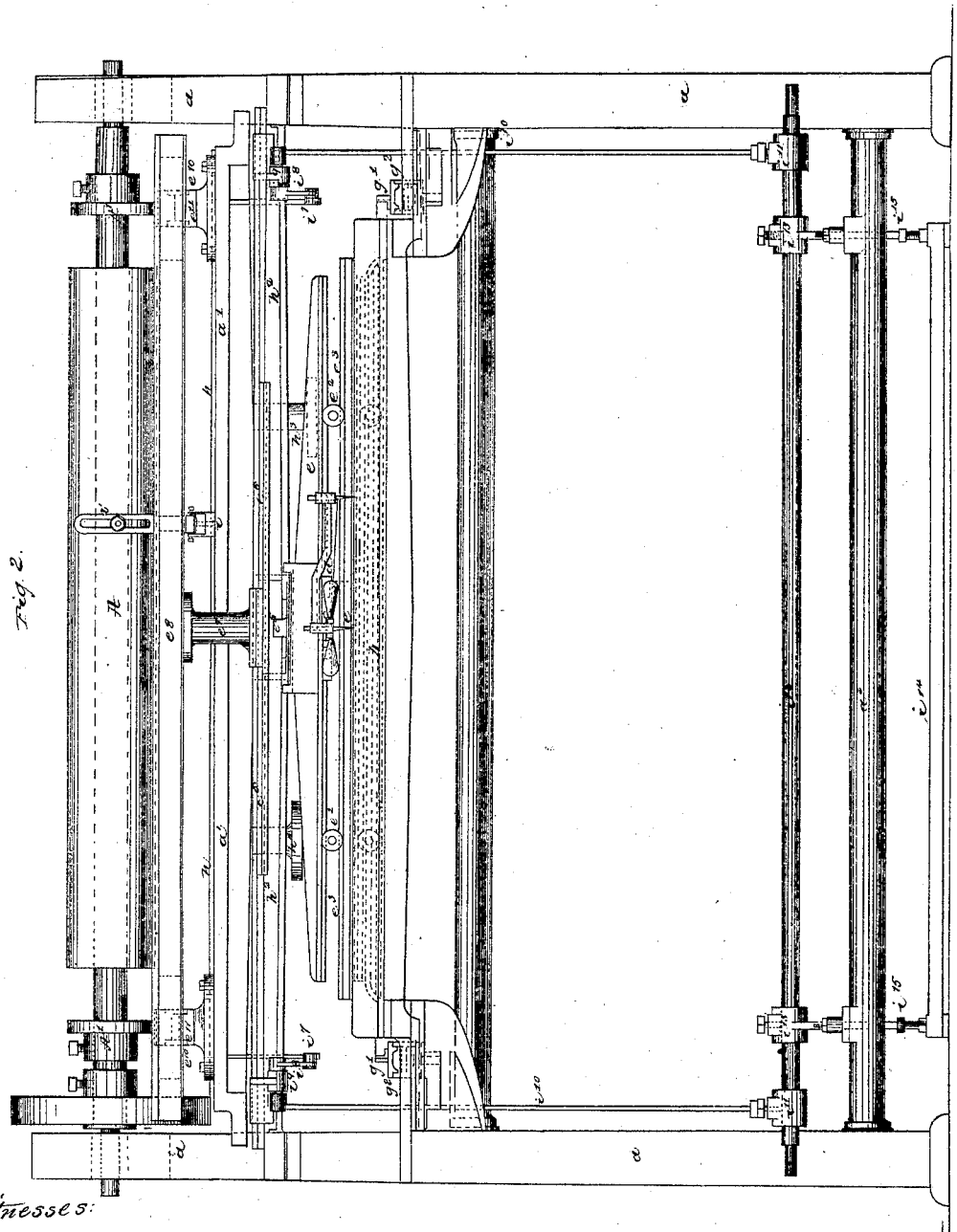

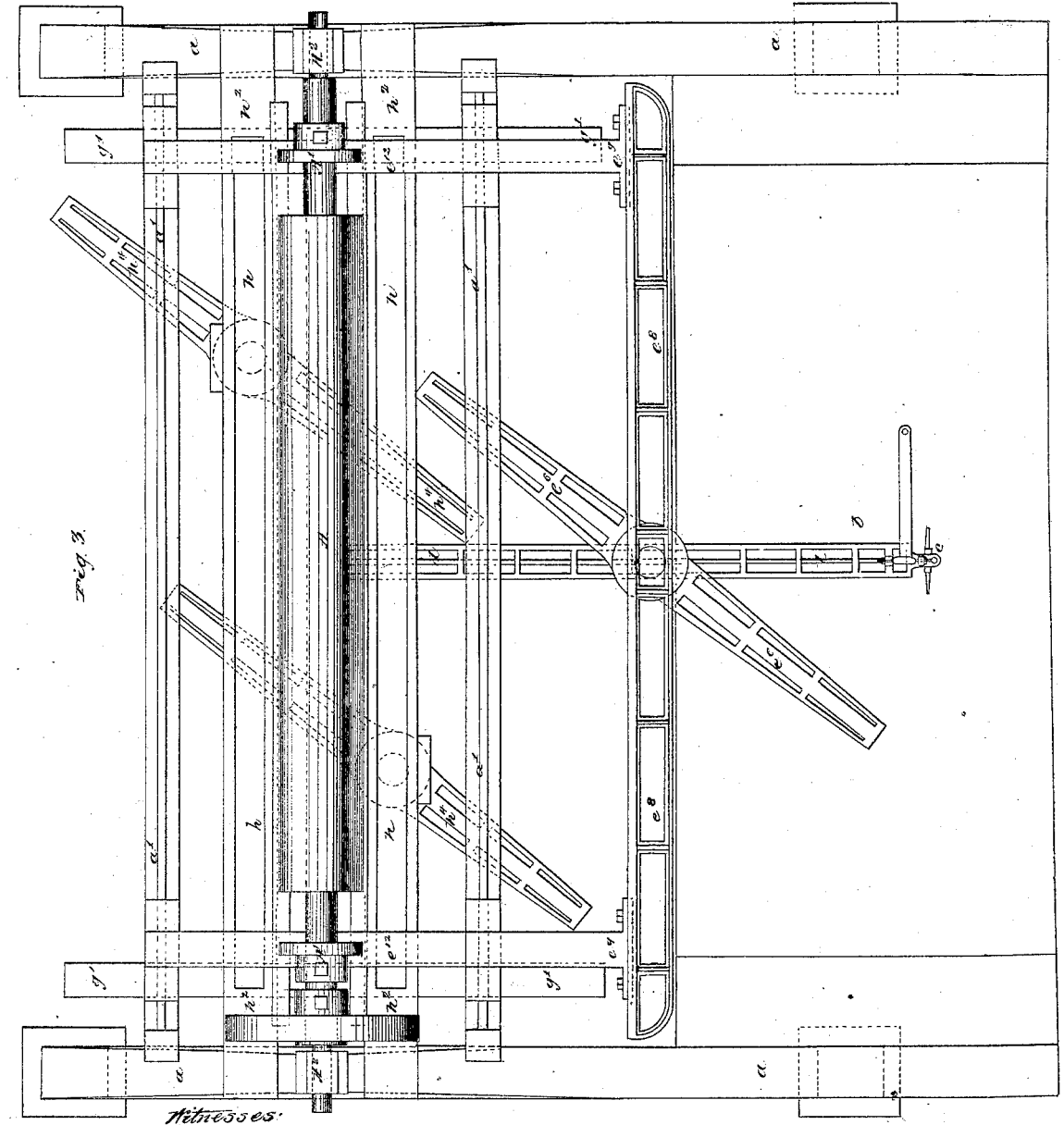

UNITED STATES PATENT OFFICE.

WILLIAM SHIELDS, OF MANCHESTER, COUNTY OF LANCASTER, ENGLAND, ASSIGNOR TO JOS. LOCKETT AND ROBERT LEAK, JR., OF SAME PLACE.

IMPROVEMENT IN MACHINES FOR ENGRAVING ROLLERS, &c.

Specification forming part of Letters Patent No. 28,332, dated May 15, 1860.

*To all whom it may concern:*

Be it known that I, WILLIAM SHIELDS, late of Salford, but now of Cheetham, in the city of Manchester, in the county of Lancaster, Great Britain, have invented certain new and useful improvements in machinery or apparatus for tracing, transferring, and engraving or cutting designs preparatory to being etched on rollers or cylinders used for printing or embossing purposes; and I do hereby declare that the following is a full, clear, and exact description thereof, reference being had to the accompanying three sheets of drawings and the letters of reference marked thereon.

My invention refers to those machines in which a tracer is employed to be passed over the design to be copied and transferred onto a roller or cylinder, the motions of the tracer being followed by the roller or cylinder and an etching-instrument or a series of etching-instruments.

The novelties of my invention refer to the mechanism employed for transmitting directly or reversed the movements of the tracer either equal, increased, or diminished in extent, as required, to the roller or cylinder, and the bar or bars carrying the etching-instruments; and the great advantage of my improvements consists in the facilities they give by which the movements of the tracer may be modified, either in direction or extent, and transmitted to the roller or etching instruments.

Figure 1 is a longitudinal section and elevation of a machine constructed according to my improvements, and showing a cylinder or roller adapted for being operated upon by etching-instruments. Fig. 2 is a front elevation; and Fig. 3, a plan view, in all of which the same letters and figures of reference where they occur denote the like parts.

The frame-work of the machine is shown at $a$, provided with a table $b$, upon which is placed the design to be copied. The tracer $c$ is jointed upon a rod or bar $d$, which rod or bar $d$ passes freely through a bar forming a carriage $e$, and between surfaces secured to the said bar or carriage $e$, which act as guides to prevent lateral "play." The bar or carriage $e$ also supports in centers a double anti-friction pulley $e'$, (shown in Fig. 1,) which comes under flanges on the sides of the rod or bar $d$, and thus assists to carry it. This rod or bar $d$ is secured to a cross-rail or carriage $f$, which is mounted on the double anti-friction rollers $f'$, (seen in Fig. 1,) which run upon the rail $g$, each end of which is carried by a bar or carriage $g'$, supported by the double anti-friction rollers $g^2$, which run on the fixed rails $g^3$, carried by the framing $a$. The bar or carriage $e$ is also supported on double anti-friction rollers $e^2$, (see Fig. 2,) which run on the fixed cross-rail $e^3$, also carried by the framing. It will now be seen that the tracer, rod, or bar $d$ is free to horizontal movements in the direction of its length or at right angles thereto, and that its end movements are facilitated by the double anti-friction pulley $e'$ and the double anti-friction rollers $g^2$, while its lateral movements are facilitated by the double anti-friction rollers $e^2$ and $f'$, carried, respectively, by the rails $e^3$ and $g'$. It will be also seen that the lateral or side movements of the rod or bar $d$ do not affect the bars or carriage $g'$, but that they act upon the bar or carriage $e$, upon the upper side of which a center or pivot $e^4$ is formed, upon which a T-formed piece $e^5$ is free to turn. This T-formed piece $e^5$ grasps the side of a bar or lever $e^6$, so that there shall be no play or the least possible amount of play, but yet leaving the bar or lever $e^6$ perfectly free to slide within the T-piece $e^6$. This bar or lever $e^6$ is carried by a stem $e^7$ from a rail $e^8$, the stem $e^7$ having a broad flange at the bottom corresponding to one on the center or fulcrum of the lever or bar $e^6$. These flanges are provided with concentric slots and set-screws, so that the lever or bar can be turned round and secured at any required angle to the bar or carriage $e$. The cross-rail $e^8$, to which the stem $e^7$ is secured, is attached to two bars $e^9$ forming another carriage, each bar $e^9$ being supported by three double anti-friction rollers $e^{10}$, which run on the fixed rails $e^{11}$, carried by the cross-stays $a'$ of the framing, and upon the moving bars plates $e^{12}$, of steel or other suitable material, are fixed, upon which either the ends of the roller A or suitable disks A', (shown in Figs. 1 and 3,) secured to the axis of the roller, rest. The axis of the roller passes through bearings A², which prevent end movement in the roller, but are perfectly free vertically in the jaws formed by the framing. It will thus be seen that as the roller A is free to rotate all movements applied to the bars or carriage $e^9$ will give rotatory motion to the roller. In other words, all lateral movements of the tracer give rotatory movement to the roller A.

The etching-instruments are mounted on a bar or carriage $h$ placed parallel to the axis of the roller. In the drawings I have placed two such bars or carriages $h$, so that etching-instruments may be used on both sides of the roller; but I make no claim for duplicating the said bars or carriages $h$. The bars or carriages $h$ are supported on double anti-friction rollers $h'$, which run on the fixed cross-rails $h^2$, which are carried by the framing. The fixed rails $h^2$ have a clear slot between them to permit the free movement of the stems $h^3$, which are secured to the bars or carriages $h$. These stems $h^3$ carry levers or bars $h^4$, arranged in a similar manner to the one $e^6$, through which the side movements of the tracer $e$ are imparted to the roller A. Each of these levers or bars $h^4$ is connected with a T-piece $h^5$, which is free to turn in a bracket $h^6$, both brackets being secured to the cross-rail $g$, and thus the end movements of the rod or bar $d$ are conveyed to the bars $h$, carrying the etching-instruments, which may be of any ordinary arrangement and construction.

I have only shown the side view of two etching-instruments in Fig. 1, and the front view of one in Fig. 2. The number employed (as is well known) depends upon the nature of the design.

Those etching-instruments which I have shown consist of a two-armed lever having its fulcrum in a bracket $i$, adjustable on the bar or carriage $h$. The upper end of the vertical arm $i'$ is curved to the segment of circle and slotted so that the etching-instrument $i^2$ can be adjusted. The horizontal arm $i^3$ has a weight $i^4$ upon it to bring the point of the etching-instrument $i^2$ with sufficient force against the roller A when it is permitted to do so. This arm $i^3$ also carries a screw $i^5$, the point of which can be adjusted to the upper surface of the cross-bar $i^6$, which is arranged to slide free vertically, and projections on the lower parts of these cross-bars at each end rest upon rods $i^7$, jointed at each end to an arm $i^8$, centered on brackets $i^9$, attached to the cross-stays $a'$. The arm $i^3$ at one end of the rod $i^7$ forms one arm of a bell-crank lever, the other arm being jointed to a vertical rod $i^{10}$, the lower end of which is jointed to an arm $i^{11}$ from a cross-shaft $i^{12}$, carried by bearings in the framing, this shaft $i^{12}$ having two arms $i^{13}$, to which a board $i^{14}$ is attached, so that pressure may be conveniently applied by the foot to lift the etching-instruments from the roller A when required.

The extent of rise of the foot-board $i^{14}$ is determined by adjustable set-screws $i^{15}$, the heads of which will come against the cross-stay $a^2$ of the framing when lifted by the action of the india-rubber spring-bands $i^{16}$, arranged in the manner shown in Figs. 1 and 2. It will be understood that when the levers or bars $h^4$ are set parallel, and the lever or bar $e^6$ at right angles to the rod or bar $d$, that no movements will be imparted either to the etching-instruments or the roller by any motion given to the tracer. It is only when the levers or bars are at an angle to the positions mentioned that movements are produced which will be less or greater in extent than that of the tracer, according as the angle or inclination of the bars or levers is less or greater than forty-five degrees. It will also be understood that when the inclination or angle of the bars or levers is reversed the motions given by the tracer will be reversed; consequently a design may at the same time, by means of the two bars $h$ and incline bars or levers $h^4$, be engraved or cut on one side of the roller reverse to that on the other side of the roller.

The design to be copied must be placed on the table $b$, so that lines upon it intended to go in the direction of the axis of the roller A will be parallel to the lengthway of the rod or bar $d$.

What I claim as my invention, and desire to secure to my assignees by Letters Patent of the United States, is—

The combination and arrangement of mechanism hereinbefore described, by which the movements of a tracer can be modified in extent and changed in direction and transmitted to etching-instruments and the roller or cylinder to be operated upon, and I particularly claim for these purposes the use of the levers or bars $e^6$ and $h^4$, and the bars or carriages $e$, $e^9$, $f$, and $g'$.

In testimony that the foregoing is a true description of my said improvements I have hereunto set my hand this 7th day of March, A. D. 1860.

WILLIAM SHIELDS.

Witnesses:
  PETER J. LINSEY,
  W. GIFFORD.